US011808263B2

United States Patent
Welte

(10) Patent No.: US 11,808,263 B2
(45) Date of Patent: Nov. 7, 2023

(54) PUMP COMPRISING AN AXIALLY ACTING SPRING GASKET

(71) Applicant: Schwäbische Hüttenwerke Automotive GmbH, Aalen-Wasseralfingen (DE)

(72) Inventor: Claus Welte, Aulendorf (DE)

(73) Assignee: Schwäbische Hüttenwerke Automotive GmbH, Aalen (DE)

( * ) Notice: Subject to any disclaimer, the term of this patent is extended or adjusted under 35 U.S.C. 154(b) by 0 days.

(21) Appl. No.: 17/351,382

(22) Filed: Jun. 18, 2021

(65) Prior Publication Data
US 2021/0404466 A1   Dec. 30, 2021

(30) Foreign Application Priority Data
Jun. 25, 2020   (DE) .................... 10 2020 116 748.2

(51) Int. Cl.
*F04C 15/00* (2006.01)
*F04C 13/00* (2006.01)
(Continued)

(52) U.S. Cl.
CPC ........ *F04C 15/0023* (2013.01); *F01C 19/005* (2013.01); *F04C 13/00* (2013.01);
(Continued)

(58) Field of Classification Search
CPC ...... F04C 15/0023; F04C 13/00; F04C 15/06; F04C 2240/30; F04C 15/0007;
(Continued)

(56) References Cited

U.S. PATENT DOCUMENTS

| 6,817,847 B2 | 11/2004 | Agner |
| 2006/0001222 A1 | 1/2006 | Dussler et al. |

(Continued)

FOREIGN PATENT DOCUMENTS

| CN | 106050647 A | 10/2016 |
| CN | 107131123 A | 9/2017 |

(Continued)

OTHER PUBLICATIONS

German Search Report issued in German Patent Application No. 10 2020 116 748.2, dated Mar. 12, 2021, with partial English translation, 8 pages.

(Continued)

*Primary Examiner* — Dominick L Plakkoottam
*Assistant Examiner* — Paul W Thiede
(74) *Attorney, Agent, or Firm* — RatnerPrestia

(57) ABSTRACT

A pump for applying fluid to an assembly, the pump including: a pump housing featuring a circumferential wall surrounding a delivery chamber of the pump, an end-facing housing wall including an outer end-facing surface of the housing which faces axially away from the delivery chamber, an inlet and an outlet for the fluid which emerges on the outer end-facing surface of the housing; a delivery member, moveable within the delivery chamber, for delivering the fluid from a low-pressure side of the pump which includes the inlet to a high-pressure side of the pump which includes the outlet; and an axial gasket which fully surrounds the outlet, in order to separate it from the low-pressure side, in an axial view onto the end-facing wall of the housing. The axial gasket is a spring gasket in the form of a disc spring or hollow-profile spring or V-profile spring or bellows spring.

20 Claims, 6 Drawing Sheets

(51) Int. Cl.
  *F04C 15/06* (2006.01)
  *F04C 19/00* (2006.01)
  *F16H 57/04* (2010.01)
  *F01C 19/00* (2006.01)

(52) U.S. Cl.
  CPC .......... *F04C 15/06* (2013.01); *F04C 2240/30* (2013.01); *F05C 2201/00* (2013.01); *F05C 2201/0448* (2013.01); *F16H 57/0436* (2013.01)

(58) Field of Classification Search
  CPC ...... F04C 15/0034; F04C 2/08; F04C 2/3445; F04C 2/3446; F04C 2/3448; F01C 19/005; F01C 21/108; F05C 2201/00; F05C 2201/0448; F16H 57/0436; F01M 1/02; F01M 2001/023; F01M 2001/0238
  See application file for complete search history.

(56) References Cited

U.S. PATENT DOCUMENTS

| | | |
|---|---|---|
| 2016/0305428 A1 | 10/2016 | Welte et al. |
| 2017/0260979 A1 | 9/2017 | Müller et al. |
| 2018/0283373 A1 | 10/2018 | Sugihara et al. |
| 2018/0372097 A1 | 12/2018 | Welte |

FOREIGN PATENT DOCUMENTS

| | | | |
|---|---|---|---|
| CN | 107923392 A | | 4/2018 |
| DE | 19904339 A1 | | 8/2000 |
| DE | 102015017078 A1 | | 10/2016 |
| DE | 102019103675 A1 | | 8/2020 |
| EP | 0252658 B1 | | 1/1988 |
| EP | 3081741 A2 | | 10/2016 |
| JP | 05256269 A | * | 10/1993 |
| WO | 0194791 A1 | | 12/2001 |

OTHER PUBLICATIONS

Chinese Office Action for Chinese Application No. 202110699379.X, dated Feb. 3, 2023 with translation, 21 pages.
Extended European Search Report for EP Application No. 21181703.6, dated Nov. 12, 2021 with translation, 11 pages.
Chinese Office Action for Chinese Application No. 202110699379.X, dated Jul. 3, 2023 with translation, 16 pages.

* cited by examiner

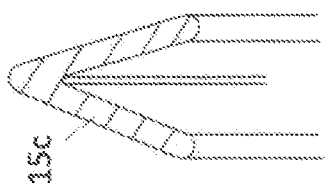
Fig. 8
Fig. 7
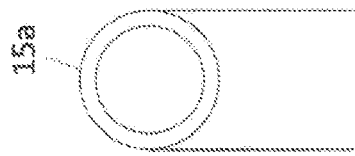
Fig. 6
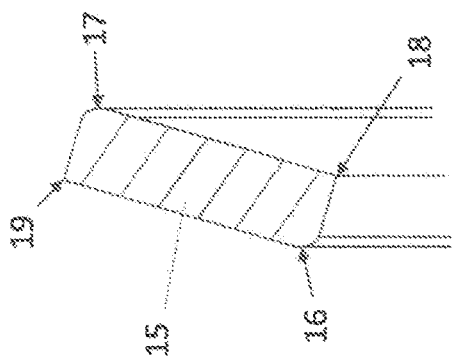
Fig. 5
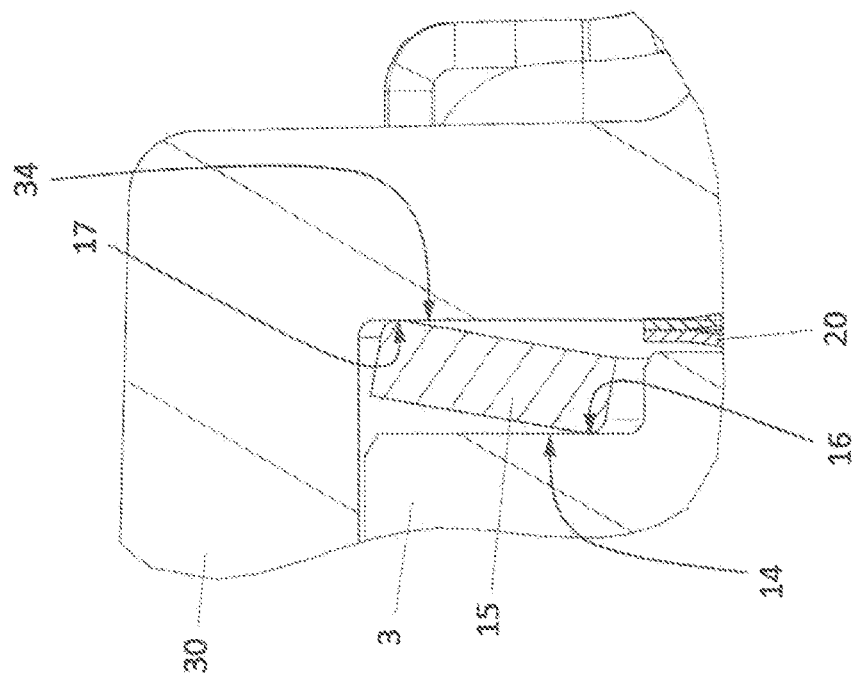
Fig. 4

PUMP COMPRISING AN AXIALLY ACTING SPRING GASKET

CROSS REFERENCE TO RELATED APPLICATIONS

This application claims benefit of priority from German Patent Application No. 10 2020 116 748.2, filed Jun. 25, 2020. The contents of this application are incorporated herein by reference.

FIELD OF THE INVENTION

The invention relates to a pump for supplying an assembly, for example a gearbox or engine, with fluid. In particular, it relates to a gasket device of the pump. The pump can for example be a lubricating oil pump, a coolant pump, a vacuum pump or preferably a gear pump. The pump can be a mono-flux or multi-flux pump, in particular a multi-circuit pump. It can be used as a gear pump for supplying a gearbox, for example an automatic gearbox and/or steering gearbox of a vehicle or a gearbox of a wind turbine, with pressure fluid. In another application, it can be used as a lubricant pump and/or coolant pump for supplying an engine, for example a drive motor of a vehicle, in particular a combustion engine, with lubricant and/or coolant, in particular lubricating oil. As a lubricating oil pump and/or coolant pump, it can in particular serve to lubricate and/or cool an internal combustion engine and/or an electric motor of a motor vehicle. In such applications, it can for example supply a drive motor or auxiliary drive motor of the motor vehicle with the pressure fluid. It is equally conceivable to use it as a combined lubricating oil pump and/or coolant pump on the one hand and gear pump on the other, in particular in embodiments in which the pump is a multi-flux pump. The pump can advantageously be embodied as a cartridge and/or for being arranged in an accommodating well.

BACKGROUND OF THE INVENTION

WO 01/94791 A1, incorporated herein by reference, discloses a pump in the form of a pump insert which is arranged in an accommodating well of an accommodating device. The pump insert is arranged axially between a base of the accommodating well and a cover of the accommodating device. When the pump is in operation, fluid is suctioned from a low-pressure space extending over the outer circumference of the pump and discharged via an end-facing wall of the pump housing and the base of the well. An annular sealing element, which surrounds the pump insert and acts as a radial gasket, separates the pump outlet from the low-pressure space. A spring device which is arranged between the base of the accommodating well and the pump insert tenses the pump insert axially against the cover. The pump insert can be axially moved to a minor extent relative to the accommodating device, against the force of the spring device, such that dimensional tolerances and changes in geometry can be compensated for. The pump comprises two working fluxes which deliver into a common pressure space, i.e. the working fluxes are not separated from each other. The pump is thus embodied as a multi-flux mono-circuit pump.

EP 3 081 741 A2, incorporated herein by reference, discloses a gear pump comprising multiple working fluxes. The pump is embodied as a multi-circuit pump and correspondingly comprises separate pressure outlets which are sealed off from each other, with at least one outlet for each flux. A first outlet is sealed off by means of an annular radial gasket which surrounds a housing of the pump. An annular outlet gasket, which is arranged within the pressure space obtained by means of the radial gasket, surrounds a second outlet in a seal, in order to separate the second outlet from the first pressure outlet. The pump is embodied as a cartridge and is introduced into an accommodating well of an accommodating device with an outer end-facing side of the pump housing first. A pressure fluid delivered by the pump is discharged via the pressure outlets and via pressure ports of the accommodating device which lie axially opposite the pressure outlets. A spring device is supported on a base of the accommodating well and presses with a spring force against the outer end-facing side of the pump housing which faces axially opposite, thus enabling tolerances and changes in geometry in the axial direction to be compensated for.

US 2017/0260979 A1, incorporated herein by reference, discloses a gasket arrangement for a vane cell pump cartridge, wherein the vane cell pump comprises two working fluxes and is embodied as a dual-circuit pump. The gasket arrangement comprises: a radial gasket which is arranged such that it encircles the circumference of the pump housing and which separates a first pressure space of the pump from the suction space; and an outlet gasket which is arranged on an outer end-facing side of the pump insert. The outlet gasket separates the first pressure space from a second pressure space of the pump and seals off a shaft passage for a drive shaft of the pump.

The prior art uses soft material gaskets and/or elastomer gaskets. If the gaskets are used as axial gaskets, it is difficult to ensure the sealing action which is based on material elasticity. The axial width of the axial join which is sealed off by means of the axial gasket can change, for example due to temperature-induced changes in geometry and/or pressure-induced movements of the pump housing or of housing parts. The join width can also vary from installation to installation due to component tolerances and/or installation tolerances. Soft material gaskets and/or elastomer gaskets require high surface compression which is uniform over their circumference in order to achieve the required seal. If surface compression changes while the pump is in operation due to changes in temperature and/or pressure or due to tolerances which vary from pump to pump, a consistently reliable sealing action can only be ensured at great effort and/or expense. Stability is also a problem. In the event of pulses, high pressures and large join widths to be bridged, there is an increased risk of gap extrusion. Another problem is the constantly increasing cost pressure.

SUMMARY OF THE INVENTION

An aspect of the invention is a cost-effective and reliable static seal for a pump. A gasket which is suitable for this purpose should be able to effectively and reliably compensate for component tolerances and/or installation tolerances and/or temperature-induced changes in geometry and/or pressure-induced movements of the pump or of pump components at the location at which the gasket is installed, while maintaining the required sealing action, even over a long period of operation.

Another aspect is of the invention a pump which is suitable for arranging in an accommodating well of an accommodating device and which for this purpose comprises an end-facing wall of the housing comprising one or more pressure outlets for discharging a pressure fluid from a delivery chamber of the pump. The intention is to cost-effectively improve the seal on the one or more pressure outlets of such a pump with regard to component tolerances and/or installation tolerances of the accommodating device and pump and/or temperature-induced changes in geometry and/or pressure-induced movements of housing structures of the pump.

An aspect of the invention correspondingly relates to a pump for supplying an assembly, for example a gearbox, with a fluid, preferably a liquid such as for example gear oil and/or lubricating oil. The pump comprises a pump housing featuring a circumferential wall of the housing, an end-facing wall of the housing, an inlet for the fluid and an outlet for the fluid. The circumferential wall of the housing surrounds a delivery chamber of the pump. The end-facing wall of the housing comprises an outer end-facing surface of the housing which faces axially away from the delivery chamber. The outlet emerges on the outer end-facing surface of the housing. The end-facing wall of the housing can be offset from the delivery chamber and can simply form an outer end-facing wall of the pump housing only. Preferably, however, the end-facing wall of the housing delineates the delivery chamber on an end-facing side. The end-facing wall of the housing can be molded, for example cast or generatively molded, in one piece with the circumferential wall of the housing. In preferred embodiments, however, the circumferential wall of the housing and the end-facing wall of the housing are produced separately from each other and rest against each other in a pressure contact on facing end-facing sides.

The pump comprises a delivery member, which can be moved within the delivery chamber, for delivering the fluid from a low-pressure side of the pump which includes the inlet to a high-pressure side of the pump which includes the outlet. The low-pressure side of the pump extends, via the inlet of the pump housing, from a reservoir for the fluid up to and into the delivery chamber. The high-pressure side of the pump extends, via the outlet, from the delivery chamber up to the assembly or, as applicable, assemblies to be supplied with the fluid. The pump can in particular be embodied as a rotary pump, and the delivery member can correspondingly be able to be rotationally moved within the delivery chamber. The pump can for example be a toothed wheel pump, in particular an externally toothed wheel pump or an internally toothed wheel pump. Instead, however, it can also for example be a pendulum-slider pump or a roller cell pump. In preferred embodiments, it is embodied as a vane cell pump or rotary vane pump.

In order to separate the outlet from the low-pressure side at the location at which the pump is installed, the pump comprises an axial gasket which fully surrounds the outlet on the outer end-facing surface of the housing in an axial view onto the end-facing wall of the housing. In accordance with an aspect of the invention, the axial gasket is a spring gasket in the form of a disc spring or an annular hollow-profile spring, a V-profile spring or a bellows spring. The spring gasket can be the only gasket separating the outlet from the low-pressure side. Alternatively, an additional gasket or in principle multiple additional gaskets can also be provided, (each of) which likewise separates the same outlet from the low-pressure side. Within this context, "separating" thus means that the spring gasket alone can also seal off the outlet from the low-pressure side in a way which is sufficient for proper pump operations.

Disc springs and hollow-profile springs, but also V-profile springs and bellows springs, can be manufactured with a sufficiently large axial spring deflection, a large spring constant and narrow tolerances, but nonetheless in a simple way. The spring gasket, i.e. the disc spring, V-profile spring, bellows spring or hollow-profile spring, fully encircles the outlet, i.e. over 360°, such that an axial gasket is obtained which is annularly self-contained.

The spring gasket comprises a first sealing stay of the spring and a second sealing stay of the spring which faces away from the first sealing stay of the spring. One of the sealing stays of the spring axially faces the outer end-facing surface of the housing and overlaps with the outer end-facing surface of the housing in the axial view, in order to separate the outlet from the low-pressure side of the pump in a sealing contact with the outer end-facing surface of the housing which fully encircles the outlet. The sealing stays of the spring are connected to each other via an annularly closed spring portion. This spring portion is of course closed all around and therefore sealed.

If, as is preferred, the spring gasket is embodied as a disc spring, the disc spring can in particular widen conically from an inner circumference to an outer circumference. The disc spring can in particular be a truncated conical surface. Alternatively, the disc spring can however also be curved concavely or convexly from the inner circumference to the outer circumference, for example round all over or instead curved with an inversion or as a polygon.

The spring gasket can in particular be embodied as a metal spring and metal gasket and thus embodied as a purely metal component. As compared to spring gaskets made of plastic or plastic-metal composite materials, such a spring gasket is less sensitive to mechanical and/or thermal stresses which are to be expected when the pump is in operation. The term "metal" is understood to mean pure metals and metal alloys. In expedient embodiments, the spring gasket consists of a spring steel.

The spring gasket can be the only gasket separating the outlet from the low-pressure side. The pump can however also comprise an additional gasket, in addition to the spring gasket in accordance with an aspect of the invention, which likewise serves to separate the same outlet and/or another outlet from the low-pressure side of the pump. In advantageous embodiments, the additional gasket is a bead gasket. The additional gasket can in particular be a purely metal gasket. The additional gasket can for example be a hollow-profile spring, a V-profile spring or a bellows spring. The additional gasket is more preferably a bead gasket or disc spring. Advantageous combinations of a spring gasket and an additional gasket include a disc spring and a bead gasket on the one hand and a first disc spring and a second disc spring on the other.

In embodiments in which the pump comprises the additional gasket in addition to the spring gasket, the spring gasket, i.e. the disc spring, hollow-profile spring, V-profile spring or bellows spring, is preferably the gasket nearest the low-pressure side in the pressure path extending along the pump housing from the low-pressure side of the pump to the high-pressure side of the pump. This inherently applies to embodiments of the pump in which the outlet is separated from the low-pressure side by means of the spring gasket in accordance with an aspect of the invention only.

The spring gasket in accordance with an aspect of the invention can advantageously replace plastic gaskets or plastic composite gaskets known from the prior art. It particularly advantageously enables a radial gasket, such as is usually arranged between the high-pressure side and the low-pressure side on the outer circumference of the pump housing, to be omitted.

The pump is suitable for arranging in or on an accommodating device which comprises an end-facing surface of the accommodating device on which a port for the outlet of the pump housing emerges. In order to be fastened in or to the accommodating device, the pump housing can be configured such that the outer end-facing surface of the housing lies opposite the end-facing surface of the accommodating device across an axial join when the pump is fitted, wherein the outlet expediently faces the port of the end-facing surface of the accommodating device and is axially flush. When the pump is fitted, the spring gasket is elastically tensed axially between the end-facing surface of the housing and the end-facing surface of the accommodating device, such that it presses axially against the end-facing surface of the housing via one of the sealing stays of the spring mentioned and axially against the end-facing surface of the accommodating device via the other of the sealing stays of the spring mentioned and fully surrounds each of the outlet of the pump housing and the port of the accommodating device and separates them from the low-pressure side.

In embodiments in which the end-facing wall of the housing and/or optionally another end-facing wall of the housing is or are each produced separately from the circumferential wall of the housing and is or are each in a pressure contact only with the circumferential wall of the housing on an end-facing side, the spring gasket can advantageously at least substantially apply the axial force required for a fluid-tight pressure contact. In such embodiments, the pump housing is axially fixed in or on the accommodating device in the region of the circumferential wall of the housing or preferably in the region of the other end-facing wall of the housing, for example by means of a screw connection, while the spring gasket is axially compressed in the join between the end-facing surface of the housing and the end-facing surface of the accommodating device and thus presses the end-facing wall of the housing against the circumferential wall of the housing. In this arrangement, the spring gasket compensates for any mechanically and/or temperature-induced changes in the geometry of the pump housing, while maintaining a sufficiently high axial pressure. Additionally or instead, the spring gasket can compensate for component tolerances in the axial tolerance chain of the pump housing, i.e. can compensate for deviations in the axial dimensions of the pump housing from one pump to another.

In such embodiments, the spring gasket performs the function of sealing the outlet of the pump housing on the one hand and the function of a pressing device, which keeps separately produced housing walls in a fluid-tight axial pressure contact, on the other.

If the pump comprises the additional gasket, and the spring gasket and the additional gasket are arranged in the same pressure path, the spring gasket in accordance with an aspect of the invention is advantageously the gasket nearest the additional gasket in the pressure path. In such embodiments, no other gasket is arranged between the spring gasket in accordance with an aspect of the invention and the additional gasket in the pressure path from the high-pressure side to the low-pressure side.

Where a "pressure path" is mentioned above, this refers to a shortest path for the fluid which extends along the pump housing from the outlet to the low-pressure side of the pump, for example to the inlet of the pump. The spring gasket in accordance with an aspect of the invention is arranged in this pressure path. The additional gasket, if provided, can be arranged in the same pressure path. The pressure path is a leakage path which is sealed off not least by means of the spring gasket in accordance with an aspect of the invention, in order to fluidically separate the outlet from the low-pressure side of the pump, aside from unavoidable leakages.

The pump can be embodied as a mono-flux pump and comprise the outlet as its one outlet. More preferably, however, the pump is a multi-flux pump and comprises one or more additional outlets for the fluid delivered by the pump. In multi-flux embodiments, the fluid delivered through the multiple outlets can be merged again downstream of the multiple outlets. More preferably, however, the multi-flux pump is a multi-circuit pump, i.e. the multiple outlets are separated from each other and deliver the fluid into a respectively assigned circuit comprising different assemblies and/or to different regions of the same assembly. In the multi-circuit embodiments, the inlet and the outlet form a first circuit, and not only another outlet but also another inlet can be additionally provided, which together form a second circuit which is separated from the first circuit.

In multi-flux embodiments and also in multi-circuit embodiments, the spring gasket in accordance with an aspect of the invention can surround the multiple outlets and jointly separate them from the low-pressure side of the pump. In preferred first embodiments, however, the spring gasket does not separate the multiple outlets from each other, but rather surrounds them as an axial gasket which is common to the multiple outlets. In such embodiments in particular, an additional gasket can be provided in order to seal off the multiple outlets or at least one of multiple outlets from the one or more other outlets, within the spring gasket in accordance with an aspect of the invention in the axial view. In principle, however, the gasket arrangement can also be configured such that the spring gasket in accordance with an aspect of the invention only surrounds one of multiple outlets or a subset of multiple outlets, while the additional gasket surrounds the spring gasket in accordance with an aspect of the invention and one or more outlets lying outside the spring gasket in accordance with an aspect of the invention in the axial view and separates them from the low-pressure side. The spring gasket in accordance with an aspect of the invention can thus be arranged upstream of the additional gasket in the pressure path (leakage path); more preferably, however, it is arranged downstream of the additional gasket in the pressure path, i.e. nearer the low-pressure side than the additional gasket.

In multi-flux, particularly multi-circuit embodiments, the spring gasket in accordance with an aspect of the invention can surround one or more of the outlets in a seal in the axial view, while an additional gasket surrounds one or more other of the outlets in a seal. The additional gasket is likewise an axial gasket and can be a spring gasket in the form of a disc spring, hollow-profile spring, V-profile spring or bellows spring. The two spring gaskets can be different or preferably the same in terms of their design. In these embodiments, the two spring gaskets can in particular be arranged parallel to each other in different pressure paths, i.e. each of the spring gaskets can be arranged in a pressure path of its own. One preferred combination is two disc springs arranged adjacently in the axial view.

The adjacently arranged spring gaskets, preferably disc springs, can be combined to form a gasket unit, by connecting the two spring gaskets to each other via a connecting stay. This simplifies handling when pre-fitting the pump unit and/or when fitting the pump. The connecting stay is expediently resilient transverse to the spring direction and/or axial direction, such that the spring gaskets can move relative to each other when axially tensed and relaxed, i.e. during spring compression and spring extension. The connecting stay can for example be a bracket or a repeatedly bent, sinuous connecting stay which is resilient transverse to the axial direction in order to allow the relative movement. The connecting stay is preferably spring-elastic and sufficiently rigid to hold the spring gaskets in a defined initial position relative to each other for pre-fitting the pump unit and also for fitting the pump. When pre-fitting the pump unit, the gasket unit can advantageously be joined to the pump housing in the region of the connecting stay.

In embodiments in which the spring gasket holds separately produced housing walls in an axial pressure contact, in principle however also in embodiments in which the circumferential wall of the housing and the end-facing wall of the housing are molded in one piece or joined to each other in another way, the spring gasket can advantageously be arranged between the end-facing surface of the housing and the end-facing surface of the accommodating device in a direct line of force. If the pump also comprises the additional gasket, the latter can be arranged in the indirect line of force to the spring gasket in accordance with an aspect of the invention. This applies in particular to embodiments in which the spring gasket and the additional gasket are arranged in a nested arrangement in the same pressure path. In embodiments in which the spring gasket and the additional gasket are arranged adjacently in different pressure paths in the axial view, the additional gasket can be arranged in the indirect line of force to the spring gasket in accordance with an aspect of the invention or, more advantageously, likewise in the direct line of force.

In advantageous embodiments, the spring gasket in accordance with an aspect of the invention is arranged such that it is subject to an axial biasing force when the fitted pump is free of pressure. In embodiments in which a bead gasket is for example provided as an additional gasket, this additional gasket can also be arranged to have a biasing force when the fitted pump is free of pressure, wherein in expedient embodiments, the biasing force of the spring gasket in accordance with an aspect of the invention is greater than the biasing force of the additional gasket which is embodied as a bead gasket.

If the spring gasket and the additional gasket are in a nested arrangement, such that one gasket surrounds the other in the axial view, it is advantageous if the spring gasket in accordance with an aspect of the invention has a greater spring constant than the additional gasket, at least in embodiments in which the additional gasket is embodied as a bead gasket. With regard to spring characteristics, it is advantageous if the spring gasket which is embodied as a disc spring, a V-profile spring, a bellows spring or a hollow-profile spring has a spring constant which is at least twice as large or at least three times as large or at least five times as large as the spring constant of the additional gasket.

If the spring gasket in accordance with an aspect of the invention and the additional gasket are the same in terms of their design, for example each embodied as a disc spring, then these two spring gaskets can in principle be arranged in a nested arrangement in the same pressure path; in advantageous embodiments, however, they are arranged adjacently in the axial view and in different pressure paths. In such arrangements, the two spring gaskets which are the same in terms of their design can in principle have different spring constants, but more preferably have at least substantially the same spring constant.

The pump can for example be a linear stroke pump or, more preferably, a rotary pump. As a rotary pump, it can be an external-axle pump, for example an externally toothed wheel pump, or an internal-axle pump, for example a vane cell pump, an internally toothed wheel pump or a pendulum-slider pump. The delivery member can comprise a rotor which can be rotationally moved about a rotational axis in the delivery chamber and which serves to deliver the fluid from one or more inlets to one or more outlets. The rotor can advantageously serve to form delivery cells which periodically increase and decrease in size as the rotor rotates, in order to deliver the fluid from the low-pressure side of the pump to the high-pressure side of the pump.

If, as is preferred, the pump is arranged in a vehicle, the pump can be driven by the drive motor of the vehicle, for example an internal combustion engine or an electric motor. In hybrid vehicles, the pump can be driven either by the internal combustion drive engine or by the electric drive motor. In an advantageous modification, driving the pump can also be configured such that the pump can be selectively driven by the internal combustion engine or by the electric motor or by both of them together. The internal combustion engine and the electric motor can then in particular drive the pump via a summing gearbox.

Features of the invention are also described in the aspects formulated below. The aspects are worded in the manner of claims and can substitute for them. Features disclosed in the aspects can also supplement and/or qualify the claims, indicate alternatives with respect to individual features and/or broaden claim features. Bracketed reference signs refer to example embodiments of the invention illustrated below in figures. They do not restrict the features described in the aspects to their literal sense as such, but do conversely indicate preferred ways of implementing the respective feature.

Aspect 1. A pump for applying fluid to an assembly, for example a gearbox, the pump comprising:
(a) a pump housing (1) featuring
a circumferential wall (2) of the housing which surrounds a delivery chamber (5) of the pump,
an end-facing wall (3) of the housing which comprises an outer end-facing surface (14) of the housing which faces axially away from the delivery chamber (5),
an inlet (6) for the fluid and
an outlet (8) for the fluid which emerges on the outer end-facing surface of the housing (14);
(b) a delivery member (10, 11), which can be moved within the delivery chamber (5), for delivering the fluid from a low-pressure side of the pump which includes the inlet (6) to a high-pressure side of the pump which includes the outlet (8); and
(c) an axial gasket which fully surrounds the outlet (8), in order to separate it from the low-pressure side, in an axial view onto the end-facing wall (3) of the housing,
(d) wherein the axial gasket is a spring gasket (15; 15a; 15b; 15c; 41) in the form of a disc spring or hollow-profile spring or V-profile spring or bellows spring.

Aspect 2. The pump according to the preceding aspect, wherein the spring gasket (15; 41) is a disc spring and is conical from an inner circumference to an outer circumference or is curved concavely or convexly in relation to the end-facing wall (3) of the housing.

Aspect 3. The pump according to any one of the preceding aspects, wherein the spring gasket (15; 41) is a disc spring comprising an inner circumference and an outer circumference which is axially offset with respect to the inner circumference, wherein the spring gasket (15; 41) comprises a first sealing stay (16) of the spring which is fully circumferential near the inner circumference and a second sealing stay (17) of the spring which faces axially away from the first sealing stay (16) of the spring and which is fully circumferential near the outer circumference, and wherein one of these sealing stays (16, 17) of the spring axially faces the outer end-facing surface (14) of the housing and overlaps with the outer end-facing surface (14) of the housing in the axial view, in order to separate the outlet (8) from the low-pressure side in a fully circumferential sealing contact with the outer end-facing surface (14) of the housing.

Aspect 4. The pump according to the preceding aspect, wherein: the spring gasket (15; 41) extends from the inner circumference to the outer circumference over a first end-facing surface which axially faces the outer end-facing surface (14) of the housing and over a second end-facing surface which faces axially away from the outer end-facing surface (14) of the housing; a first transition region circumferentially connects the inner circumference to the first end-facing surface, a second transition region circumferentially connects the outer circumference to the second end-facing surface, a third transition region (18) circumferentially connects the inner circumference to the second end-facing surface, and a fourth transition region (19) circumferentially connects the outer circumference to the first end-facing surface; one of the sealing stays (16, 17) of the spring extends in the first transition region, and the other of the sealing stays (16, 17) of the spring extends in the second transition region; and at least one of the sealing stays (16, 17) of the spring is flattened and/or rounded with a larger radius of curvature as compared to the third and/or fourth transition region (18, 19).

Aspect 5. The pump according to Aspect 1, wherein the spring gasket (15a) is a hollow-profile spring which is annularly circumferential in a closed arc and closed in cross-sections, for example in the shape of an annular circle.

Aspect 6. The pump according to Aspect 1, wherein the spring gasket (15b) is a hollow-profile spring which is annularly circumferential in a closed arc and slotted in cross-sections, for example in a C-shape.

Aspect 7. The pump according to Aspect 1, wherein the spring gasket (15c) is a V-profile spring (15c) which is annularly circumferential in a closed arc, wherein the V-profile is preferably arranged to lie between the end-facing surface (14) of the housing and the end-facing surface (34) of the accommodating device and preferably opens towards the outlet (8).

Aspect 8. The pump according to any one of the preceding aspects, wherein the spring gasket (15; 15a; 15b; 15c; 41) is a purely metal spring.

Aspect 9. The pump according to any one of the preceding aspects, wherein the spring gasket (15; 15a; 15b; 15c, 41) is a gasket nearest the low-pressure side in the pressure path extending along the pump housing (1) from the high-pressure side to the low-pressure side.

Aspect 10. The pump according to any one of the preceding aspects, wherein the spring gasket (15; 15a; 15b; 15c; 41) is a gasket nearest the low-pressure side in the pressure path extending along the pump housing (1) from the outlet (8) to the low-pressure side.

Aspect 11. The pump according to any one of the preceding aspects, wherein the spring gasket (41) is a gasket nearest the outlet (8) in the pressure path extending along the pump housing (1) from the outlet (8) to the low-pressure side.

Aspect 12. The pump according to any one of the preceding aspects, wherein a gasket on the circumference of the pump housing (1) is omitted in the pressure path extending along the pump housing (1) from the high-pressure side to the low-pressure side.

Aspect 13. The pump according to any one of the preceding aspects, wherein a radial gasket for separating the high-pressure side from the low-pressure side is not provided on the pump housing (1).

Aspect 14. The pump according to any one of the preceding aspects, wherein the pump comprises an additional gasket (20) which surrounds the outlet (8) in the axial view in order to seal it off, and wherein the spring gasket (15; 15a; 15b; 15c) surrounds the additional gasket (20) or the additional gasket (20) surrounds the spring gasket (15; 15a; 15b; 15c).

Aspect 15. The pump according to the preceding aspect, wherein the spring gasket (15; 15a; 15b; 15c) is held on the pump housing (1) by means of the additional gasket (20).

Aspect 16. The pump according to any one of the immediately preceding two aspects, wherein the additional gasket (20) is held on the pump housing (1) and preferably joined to the pump housing (1) and engages behind the spring gasket (15; 15a; 15b; 15c) as viewed from the outer end-facing surface (14) of the housing and thus holds it on the pump housing (1), directly axially facing the outer end-facing surface (14) of the housing.

Aspect 17. The pump according to any one of the immediately preceding three aspects, wherein the additional gasket (20) is likewise an axial gasket.

Aspect 18. The pump according to any one of the immediately preceding four aspects, wherein the additional gasket (20) is a bead gasket, preferably a metal bead gasket.

Aspect 19. The pump according to the preceding aspect, wherein the additional gasket (20) is not coated with elastomer and preferably contains no elastomer.

Aspect 20. The pump according to any one of the immediately preceding six aspects, the additional gasket (20) comprising:
 a bead loop (23) which surrounds an inner region (26) in an axial view and comprises an end-facing surface of the bead for an axial contact with the outer end-facing surface (14) of the housing;
 a passage (29) for fluid which is located in the inner region (26),
 wherein the bead loop (23) is a smallest bead loop surrounding the passage (29); and
 a rigidifying structure (28) which extends from the bead loop (23) into the inner region (26) in the axial view, in order to rigidify the bead loop (23).

Aspect 21. The pump according to any one of the immediately preceding seven aspects, wherein the spring gasket (15; 15a; 15b; 15c) is a gasket nearest the additional gasket (20) in the pressure path extending from the low-pressure side to the high-pressure side.

Aspect 22. The pump according to any one of the preceding aspects, wherein the circumferential wall (2), the end-facing wall (3) and optionally another end-facing wall (4) of the pump housing (1) are produced separately from each other and axially arranged adjacently as a pre-fitted unit, preferably lying one directly on the other in a loose axial contact, and are loosely held together by means of a holding device (13).

Aspect 23. The pump according to the preceding aspect and Aspect 14, wherein the additional gasket (20) is axially held directly on the end-facing wall (3) of the housing by means of the holding device (13) or independently of the holding device (13) and holds the spring gasket (15; 15a; 15b; 15c), preferably by engaging behind the spring gasket (15; 15a; 15b; 15c) as viewed from the end-facing wall (3) of the housing.

Aspect 24. The pump according to any one of the preceding aspects and Aspect 14, wherein the pump is fitted in or on an accommodating device (30), and the additional gasket (20) is arranged between the outer end-facing surface (14) of the housing and an end-facing surface (34) of the accommodating device (30) in an axial indirect line of force to the spring gasket (15; 15*a*; 15*b*; 15*c*).

Aspect 25. The pump according to any one of the preceding aspects, wherein the pump comprises a first flux featuring the inlet (6) and the outlet (8) and an additional flux featuring an additional outlet (9) and optionally an additional inlet (7), and the spring gasket (15; 15*a*; 15*b*; 15*c*) also surrounds the additional outlet (9) in the axial view, in order to separate the outlets (8, 9) from the low-pressure side.

Aspect 26. The pump according to any one of the preceding aspects, wherein the spring gasket (15; 15*a*; 15*b*; 15*c*) forms a circular ring in the axial view.

Aspect 27. The pump according to any one of Aspects 1 to 24, wherein the pump comprises a first flux featuring the inlet (6) and the outlet (8), an additional flux featuring an additional outlet (9) and optionally an additional inlet (7), and an additional axial gasket in the form of an additional spring gasket (42) which surrounds the additional outlet (9) in the axial view, wherein the spring gaskets (41, 42) are disc springs and are arranged adjacently in the axial view, in order to separate the outlets (8, 9) from each other and from the low-pressure side.

Aspect 28. The pump according to the preceding aspect, wherein the pump is fitted in or on an accommodating device (30), and the spring gasket (41) and the additional gasket (42) are arranged adjacently between the outer end-facing surface (14) of the housing and an end-facing surface (34) of the accommodating device (30), each in an axial direct line of force.

Aspect 29. The pump according to any one of the immediately preceding two aspects, wherein a connecting stay (45) connects the spring gaskets (41, 42) to each other, to form a gasket unit (40) which can be handled as a unit.

Aspect 30. The pump according to the preceding aspect, wherein the connecting stay (45) is elastically resilient in order to allow movements of the spring gaskets (41, 42) relative to each other, associated with changes in spring tension.

Aspect 31. The pump according to any one of the immediately preceding two aspects, wherein the spring gaskets (41, 42) are held on the pump housing (1) by means of the connecting stay (45).

Aspect 32. The pump according to any one of the immediately preceding five aspects, wherein a laminar, preferably planar resistance structure (43) through which the fluid can flow extends in an inner region of the spring gasket (41) and/or in an inner region of the additional gasket (42) and forms a flow resistance for the fluid when the pump is in operation, but at most negligibly prevents the spring compression and spring extension of the spring gasket (41) and/or the additional gasket (42).

Aspect 33. The pump according to any one of the preceding aspects, wherein the spring gasket (15; 15*a*; 15*b*; 15*c*; 41) is subject to an axial bias, when the pump is fitted and free of pressure, and presses the end-facing wall (3) of the housing axially towards the circumferential wall (2) of the housing and preferably directly against the circumferential wall (2) of the housing.

Aspect 34. The pump according to any one of the preceding aspects, wherein the pump is fitted in or on an accommodating device (30), and the spring gasket (15; 15*a*; 15*b*; 15*c*; 41) is arranged between the outer end-facing surface (14) of the housing and an end-facing surface (34) of the accommodating device (30) and subject to an axial bias when the pump is free of pressure.

Aspect 35. The pump according to any one of the preceding aspects, wherein the pump is fitted in or on an accommodating device (30), and the spring gasket (15; 15*a*; 15*b*; 15*c*; 41) is arranged and axially tensed between the outer end-facing surface (14) of the housing and an end-facing surface (34) of the accommodating device (30) in an axial direct line of force.

Aspect 36. The pump according to the preceding aspect, wherein the additional spring gasket (42) is likewise arranged between the outer end-facing surface (14) of the housing and the end-facing surface (34) of the accommodating device in the direct line of force.

Aspect 37. The pump according to any one of the preceding aspects, wherein: the pump comprises an accommodating device (30) or is arranged in an accommodating device (30); the accommodating device (30) surrounds the pump housing (1) and comprises a base featuring an end-facing surface (34) of the accommodating device and a port (31) for the outlet (8); and the spring gasket (15; 15*a*; 15*b*; 15*c*; 41) is in a sealing contact with each of the outer end-facing surface (14) of the housing and the end-facing surface (34) of the accommodating device, in order to separate the high-pressure side from the low-pressure side of the pump.

Aspect 38. The pump according to the preceding aspect, wherein the pump housing (1) is joined to the accommodating device (30), such that it cannot be axially moved, on an end-facing side which lies axially opposite the end-facing wall (3) of the housing across the circumferential wall (2) of the housing.

Aspect 39. The pump according to any one of the immediately preceding two aspects, wherein the end-facing surface (34) of the accommodating device is circumferentially smooth, for example planar, in the region of a sealing stay (17) of the spring gasket (15; 15*a*; 15*b*; 15*c*; 41) which axially faces the end-facing surface (34) of the accommodating device, in order to circumferentially form an uninterrupted sealing abutment for the sealing stay (17) of the spring which axially faces the end-facing surface (34) of the accommodating device.

Aspect 40. The pump according to any one of the preceding aspects, wherein the outer end-facing surface (14) of the housing is circumferentially smooth, for example planar, in the region of a sealing stay (16) of the spring gasket (15; 15*a*; 15*b*; 15*c*; 41) which axially faces the outer end-facing surface (14) of the housing, in order to circumferentially form an uninterrupted sealing abutment for the sealing stay (16) of the spring which axially faces the outer end-facing surface (14) of the housing.

Aspect 41. The pump according to any one of the preceding aspects, wherein the circumferential wall (2) of the housing and the end-facing wall (3) of the housing axially rest against each other in a pressure contact and delineate the delivery chamber (5) at its circumference and on an end-facing side, and wherein the spring gasket (15; 15*a*; 15*b*; 15*c*; 41) presses the end-facing wall (3) of the housing axially against the circumferential wall (2) of the housing with a spring force when the pump is fitted.

Aspect 42. The pump according to any one of the preceding aspects, wherein the pump housing (1) comprises another end-facing wall (4) of the housing, and the circumferential wall (2) of the housing and the end-facing walls (3, 4) rest axially against each other, stacked, in a pressure contact and delineate the delivery chamber (5) at its circumference and on the end-facing sides, and wherein the spring gasket (15; 15*a*; 15*b*; 15*c*; 41) presses the end-facing walls (3, 4) axially against the circumferential wall (2) of the housing with a spring force when the pump is fitted.

BRIEF DESCRIPTION OF THE DRAWINGS

Example embodiments of the invention are explained below on the basis of figures. Features disclosed by the example embodiments, each individually and in any combination of features, advantageously develop the claims, the aspects and the embodiments which have been additionally described above. There is shown:

FIG. 4 the detail Y in FIG. 3;

FIG. 5 the spring gasket of the first example embodiment;

FIG. 6 a spring gasket of a second example embodiment;

FIG. 7 a spring gasket of a third example embodiment;

FIG. 8 a spring gasket of a fourth example embodiment;

DETAILED DESCRIPTION OF THE INVENTION

Figure 1:
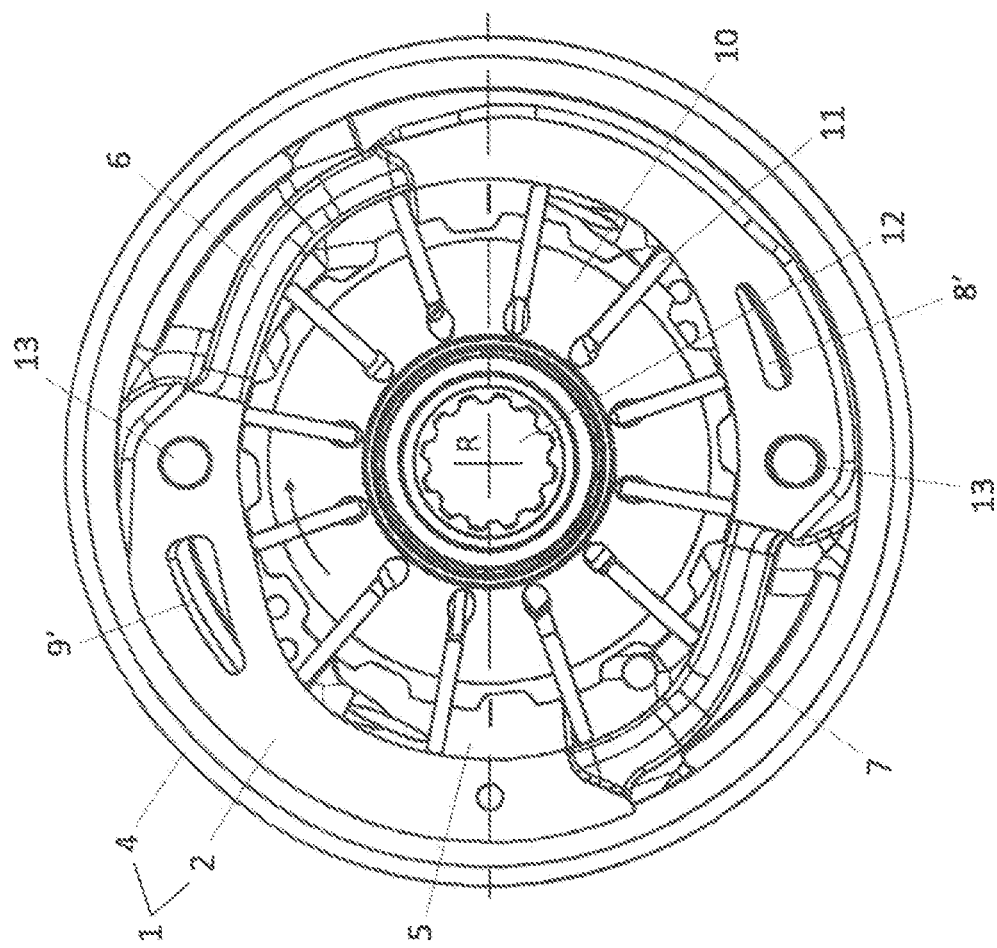
FIG. 1 a pump in an axial view onto a delivery chamber of the pump.

FIG. 1 shows a pump in an axial view onto a pump housing 1. A delivery chamber 5 is formed in the pump housing 1. The pump housing 1 comprises a circumferential wall 2, which surrounds the delivery chamber 5, and end-facing walls which axially delineate the delivery chamber 5 on both end-facing sides, one end-facing wall 4 of which can be seen. The other of the end-facing walls has been removed in FIG. 1, in order to give a clear view into the delivery chamber 5.

The pump is embodied as a rotary pump and comprises a rotor 10, which can be rotated about an axis of rotation R in the delivery chamber 5, and a plurality of vanes 11 which are guided in slots of the rotor 10 such that they can be moved radially or at least substantially in a radial direction, as is usual in vane cell pumps. The rotor 10 and the vanes 11 together form an impeller of the pump. An inner circumference of the circumferential wall 2 of the housing comprises a guide surface for the vanes 11. When the rotor 10 rotates, the vanes 11 are pressed outwards against the guide surface of the circumferential wall 2 of the housing. When the rotor 10 is rotating, the guide surface determines how far the vanes 11 protrude beyond the outer circumference of the rotor 10. The vanes 11 delineate delivery cells, formed in the delivery chamber 5, in the circumferential direction. The profile of the guide surface of the circumferential wall 2 of the housing is chosen such that the delivery cells periodically increase in size on a low-pressure side of the delivery chamber 5 and decrease again in size on a high-pressure side of the delivery chamber 5 when the rotor 10 rotates, in order to expel a fluid, which flows into the delivery chamber 5 through an inlet on the low-pressure side of the delivery chamber 5, through an outlet situated on the high-pressure side of the delivery chamber 5 at an increased pressure as a pressure fluid. In advantageous embodiments, the pump is configured to suction the fluid through the inlet, for example against gravity.

The pump is a multi-flux pump—in the example embodiment, a dual-flux pump, i.e. it comprises a first working flux and a second working flux. The delivery chamber 5 correspondingly comprises a first inlet 6 and a first outlet for the first working flux and a second inlet 7 and a second outlet for the second working flux. When the pump is in operation, the rotor 10 rotates clockwise in FIG. 1, as indicated by a directional arrow of rotation. The pressure outlets are arranged in the end-facing wall of the housing, which is not shown in FIG. 1. A first connecting channel which extends axially through the circumferential wall 2 of the housing on the high-pressure side of the first working flux is denoted by 8', and a second connecting channel which extends axially through the circumferential wall 2 of the housing on the high-pressure side of the second working flux is denoted by 9'. The connecting channels 8' and 9' connect pressure spaces formed in the region of the end-facing wall 4 of the housing to the pressure outlets of the axially opposite end-facing wall (not shown in FIG. 1) of the pump housing 1.

Figure 2:
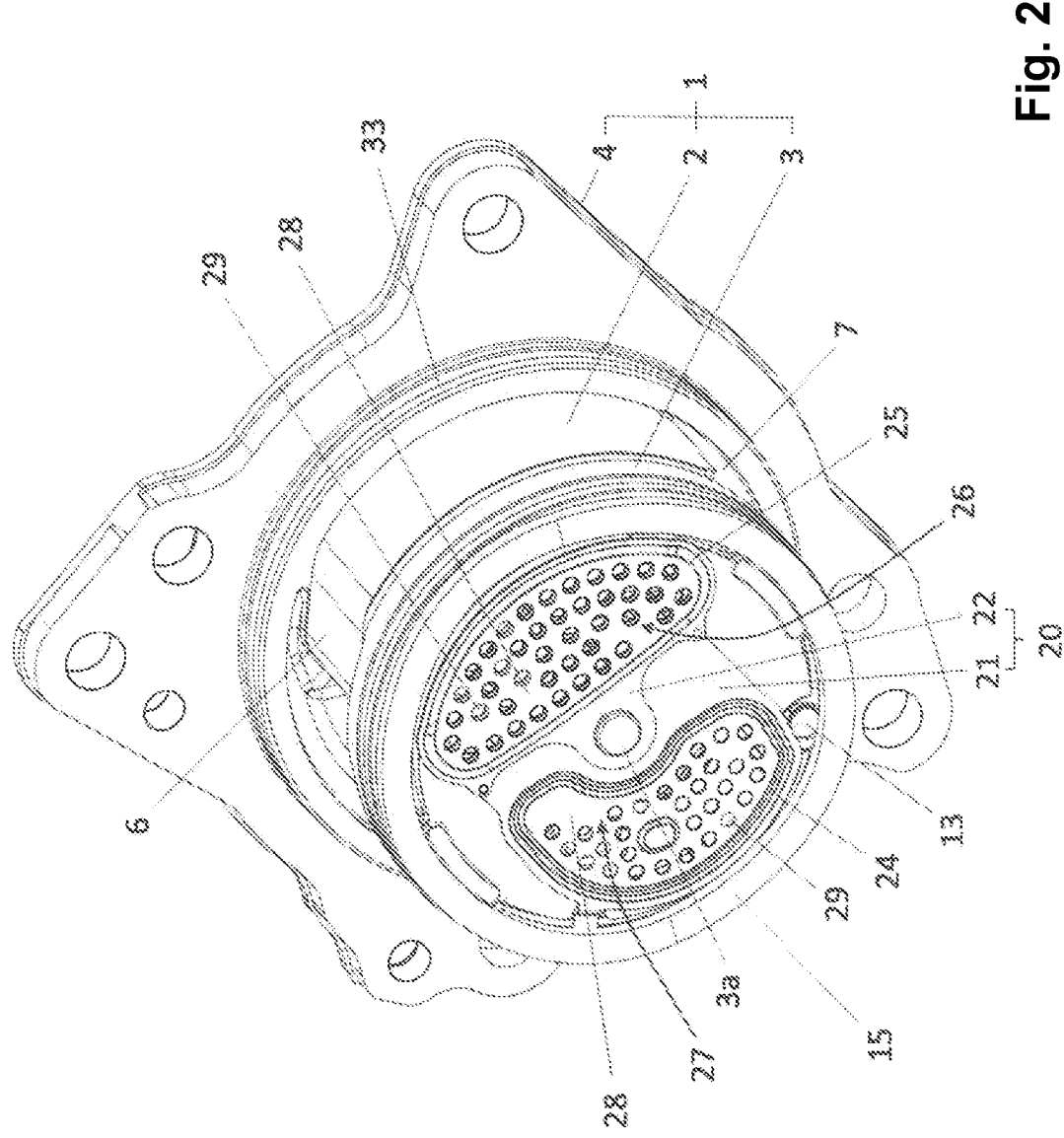
FIG. 2 the pump in an isometric view onto an end-facing side on which a spring gasket of a first example embodiment is arranged.

FIG. 2 shows the pre-fitted pump in an isometric view onto an end-facing outlet side of the pump. The outlet side is formed on an outer end-facing side of the first end-facing wall 3 of the housing, which is not shown in FIG. 1 but can be seen in FIG. 2. A spring gasket 15, in a first example embodiment, and an additional gasket in the form of a bead gasket 20 are arranged on the outer end-facing side of the end-facing wall 3 of the housing. The spring gasket 15 of the first example embodiment is a disc spring. The first outlet and the second outlet emerge on the outer end-facing side of the end-facing wall 3 of the housing. The bead gasket 20 covers these pressure outlets. The connecting channels 8' and 9' which can be seen in FIG. 1 are assigned to the pressure outlets, wherein the connecting channel 8' emerges into the first outlet which leads through the end-facing wall 3 of the housing, and the connecting channel 9' emerges into the second outlet which likewise leads through the end-facing wall 3 of the housing.

The bead gasket 20 comprises multiple bead loops, each of which encircles an inner region of the bead gasket 20 in the form of a bead loop. A bead loop 24 and a bead loop 25 can be seen in FIG. 2. The bead loop 24 surrounds an inner region 27 of the bead gasket 20 which lies axially opposite the second outlet and overlaps with it in an axial view. The bead loop 25 surrounds an inner region 26 of the bead gasket 20 which lies axially opposite the first outlet and overlaps with it in an axial view.

The circumferential wall 2 of the housing forms a closed ring, while the end-facing walls 3 and 4 are each plate-shaped. In a first angular region, over which the low-pressure side of the first working flux extends, the circumferential wall 2 of the housing comprises a cavity on each of the two end-facing sides in order to form the first inlet 6. In another angular range, over which the low-pressure side of the second working flux extends, the circumferential wall 2 of the housing also comprises a second cavity on each of the two end-facing sides in order to form the second inlet 7. The fluid can flow into the delivery chamber 5 (FIG. 1) via the end-facing cavities of the circumferential wall 2 of the housing, i.e. via the first inlet 6 and the second inlet 7. The outer circumference of the circumferential wall 2 of the housing also comprises a cavity in each of the angular range of the inlet 6 and the angular range of the inlet 7. The cavities on the circumference respectively extend axially from one end-facing cavity to the axially opposite other end-facing cavity. The cavities on the circumference connect the two end-facing cavities of the first inlet 6 and, on the opposite side, the two end-facing cavities of the second inlet 7, such that a comparatively large-volumed first inlet 6 and a similarly large-volumed second inlet 7 are obtained. The end-facing walls 3 and 4 can each be provided with assigned cavities in order to increase the flow cross-section of the inlet 6 and the flow cross-section of the inlet 7.

FIG. 2 shows the end-facing wall 4 of the housing, comprising a flange which serves to fit the pump. For the sake of simplicity, this flange is not shown in the axial view of FIG. 1. When the pump is fitted, the pump housing 1 is fixed to an accommodating device in the region of the flange.

A radial gasket 33 is arranged on the outer circumference of the pump housing 1. In the example embodiment, it is accommodated in a groove which encircles the outer circumference of the end-facing wall 4 of the housing. The radial gasket 33 serves to separate a low-pressure space, which surrounds the pump housing 1 on the outer circumference when the pump is fitted, from the external environment of the pump at the location at which it is installed.

The wall structures of the pump housing 1, namely the circumferential wall 2 of the housing, the first end-facing wall 3 of the housing and the second end-facing wall 4 of the housing, together delineate the delivery chamber 5 (FIG. 1) over its circumference and axially on its end-facing sides. The end-facing walls 3 and 4 of the housing each rest against the circumferential wall 2 of the housing in an axial contact. The circumferential wall 2 of the housing can be joined to the end-facing walls 3 and 4, advantageously loosely, i.e. not in a material fit.

The circumferential wall 2 of the housing and the end-facing walls 3 and 4 are held together in an axial layered composite within the pre-fitted pump unit by means of a holding device. The holding device comprises at least one holder 13; in the example embodiment, it comprises a first holder 13 and a second holder 13, as can be seen in FIG. 1. The respective holder 13 protrudes from the second end-facing wall 4 of the housing in an axial direction in the shape of a rod, protrudes through the circumferential wall 2 of the housing in an axial direction and protrudes through or into the first end-facing wall 3 of the housing. In the example embodiment, one of the holders 13 protrudes through the first end-facing wall 3 of the housing, while the other holder 13 protrudes into a blind bore in the end-facing wall 3 of the housing. The holders 13 can be fixedly connected to the second end-facing wall 4 of the housing in a frictional fit or in a material fit. The holder 13 which protrudes through the first end-facing wall 3 of the housing is in a holding engagement with the first end-facing wall 3 of the housing or with the bead gasket 20. The holding engagement is such that the holder 13 in question is guided through a passage in the end-facing wall 3 of the housing as viewed from the end-facing wall 4 of the housing, but once guided through, can no longer be retracted. When pre-fitting the pump, the circumferential wall 2 of the housing and the first end-facing wall 3 of the housing are pushed along the holders 13 towards the end-facing wall 4 of the housing.

The bead gasket 20 is held on the pump housing 1 on the outer end-facing side of the end-facing wall 3 of the housing. For the purpose of centering, the bead gasket 20 comprises a central passage which is pushed, during pre-fitting, onto an axial projection 3a on the outer end-facing side of the end-facing wall 3 of the housing. The bead gasket 20 can for example be held on the pump housing 1 in an engagement with the projection 3a and/or in an engagement with the holding device, i.e. in an engagement with at least one of the holders 13.

The spring gasket 15 is likewise held on the outer end-facing side of the end-facing wall 3 of the housing when the pump is pre-fitted. The pump housing 1 which is held together as a loose layered composite by means of the holding means forms the pre-fitted pump unit, in the form of a fitting unit which is easy to fit as a whole, with the spring gasket 14 and the bead gasket 20.

The spring device 15 is designed to exert an axial spring force on the pump housing 1 when the pump is fitted, in order to press the end-facing walls 3 and 4 of the housing axially against the circumferential wall 2 of the housing and thus hold the delivery chamber 5 in a seal. The spring gasket 15 additionally serves to separate the outlets from the low-pressure side of the pump.

Figure 3:
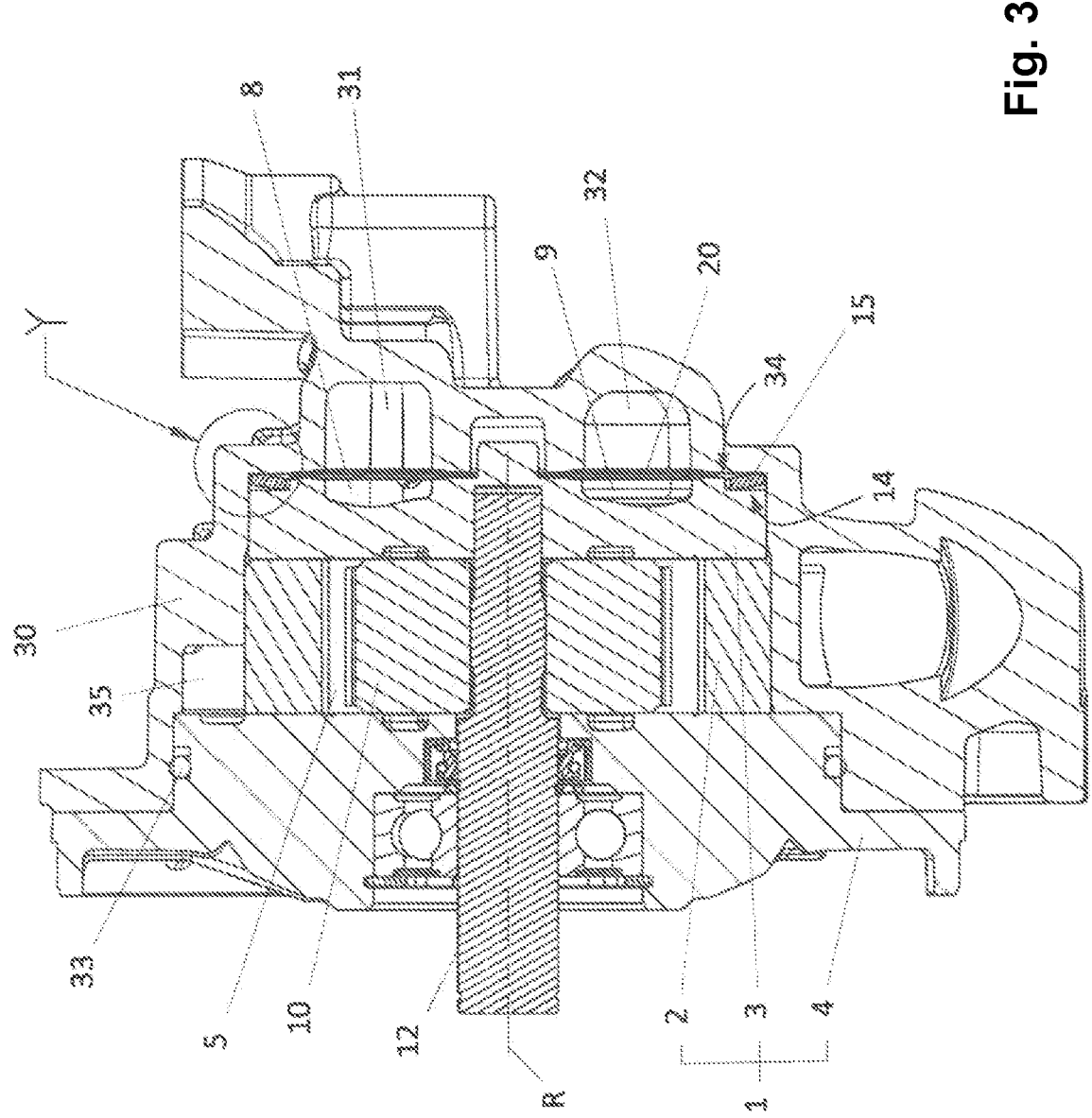
FIG. 3 an arrangement of the pump in an accommodating device.

FIG. 3 shows the fitted pump in a longitudinal section which intersects the axis of rotation R. The pump is arranged on an accommodating device 30. It is arranged in such a way that the pump protrudes into an accommodating well of the accommodating device 30 with the spring gasket 15 and the bead gasket 20 first. The fitting flange of the end-facing wall 4 of the pump housing rests against the accommodating device 30, and the pump is fastened to the accommodating device 30 in the region of the flange, for example by means of a screw connection.

The rotor 10 is non-rotationally connected to a drive shaft 12. The drive shaft 12 extends through the end-facing wall 4 of the housing and through the rotor 10 and protrudes into a blind bore of the end-facing wall 3 of the housing. A drive portion of the drive shaft 12 projects outwards beyond the end-facing wall 4 of the housing and can be rotationally driven in this drive portion. A drive wheel, for example a belt pulley for a belt drive, a chain wheel for a chain drive or a toothed wheel for a toothed wheel drive, can be non-rotationally connected to the drive shaft 12 in the drive portion. The shaft passage of the end-facing wall 4 of the housing is sealed by means of a shaft gasket.

The pump protrudes, with its port side first, into the accommodating device 30. The outer end-facing surface 14 of the end-facing wall 3 of the housing lies opposite an end-facing surface 34 of the accommodating device at a small axial distance, i.e. across an axial join, at the base of the accommodating well.

A low-pressure space 35 which is formed on the outer circumference of the pump housing 1 is delineated on the radially outer side by an inner circumference of the accommodating device 30, on an end face by the radial gasket 33 and at the other axial end by the spring gasket 15. When the pump is in operation, the fluid enters the delivery chamber 5 via the low-pressure space 35 and the inlets 6 and 7 which emerge in the low-pressure space 35 (FIGS. 1 and 2). The low-pressure side of the pump comprises the low-pressure space 35, the inlets 6 and 7 and the low-pressure side of the pumping chamber 5.

A first pressure port 31 and a second pressure port 32, via which the fluid can be discharged in an axial direction, emerge on the end-facing surface 34 of the accommodating device on the high-pressure side of the pump. As has already been explained on the basis of FIG. 1, the fluid is discharged in the region of the first working flux via a first outlet 8 which leads through the end-facing wall 3 of the housing and in the region of the second working flux via a second outlet 9 which likewise leads through the end-facing wall 3 of the housing. The connecting channels 8' and 9' which can be seen in FIG. 1 emerge into the assigned pressure outlets: the connecting channel 8' into the first outlet 8, and the connecting channel 9' into the second outlet 9. The pressure outlets 8 and 9 extend through the end-facing wall 3 of the housing and each emerge into a respective recess on the outer end-facing surface 14 of the end-facing wall 3 of the housing. These recesses can be seen in FIG. 3 and are also referred to here as the first outlet 8 and second outlet 9. The first outlet 8 of the pump lies axially opposite the first pressure port 31. The second outlet 9 of the pump lies axially opposite the second pressure port 32. When the pump is in operation, the fluid of the first working flux is discharged via the first outlet 8 and the first pressure port 31. The fluid of the second working flux is discharged via the second outlet 9 and the second pressure port 32.

The bead gasket 20 is arranged in the axial join which remains between the end-facing surface 14 of the housing and the end-facing surface 34 of the accommodating device and separates the first outlet 8 and first pressure port 31 from the second outlet 9 and second pressure port 32.

When the pump is fitted, the spring gasket 15 is supported axially on the end-facing surface 34 of the accommodating device, and its spring force acts axially on the outer end-facing surface 14 of the housing. In this way, the spring force of the spring gasket 15 presses the end-facing wall 3 of the housing against the circumferential wall 2 of the housing and presses the circumferential wall 2 of the housing against the end-facing wall 4 of the housing, thus obtaining an axially sealed and fixed composite of the end-facing walls 3 and 4 and the circumferential wall 2 of the housing and ensuring that the delivery chamber 5 is sealed.

The spring gasket 15 surrounds the outlet 8 and also the outlet 9 in a single, continuously and fully circumferential, self-contained arc. As already mentioned, the spring gasket 15 is a disc spring. It separates the first outlet 8 and the second outlet 9 from the low-pressure side of the pump—in particular, in the example embodiment, the low-pressure space 35. It is the gasket nearest the low-pressure side as viewed from the high-pressure side. Because the spring gasket 15 not only applies the axial spring force in order to press the housing walls 2, 3 and 4 together, but is also developed into an axial gasket in an additional function, a radial gasket such as is usually arranged on the outer circumference of the pump housing 1 between the high-pressure side and the low-pressure side can be omitted.

In the example embodiment, the drive shaft 12 terminates in a blind bore of the end-facing wall 3. In a modification of the pump, the end-facing wall 3 can comprise a transit bore instead of a blind bore, into which the drive shaft protrudes. In such embodiments, an additional gasket can be provided which seals off the shaft passage thus formed from the outlet 8 and also from the outlet 9. This additional gasket can in particular be embodied as an additional disc spring and can form a self-contained axial sealing ring which encircles the shaft passage. One of the two sealing stays of this optional additional disc spring is in a sealing contact, which is annularly closed around the shaft passage, with the end-facing surface 14 of the housing, and its axially opposite sealing stay is in a circumferentially self-contained sealing contact with the end-facing surface 34 of the accommodating device.

FIG. 4 shows the detailed region Y indicated in FIG. 3 and comprising the spring gasket 15. The disc spring 15 is also shown individually in FIG. 5.

In the first example embodiment, the spring gasket 15 is embodied as a disc spring in the form of a truncated conical surface. It comprises an inner circumference and an outer circumference which are axially offset with respect to each other. A first sealing stay 16 of the spring is fully and continuously circumferential near the inner circumference on an end-facing side of the spring gasket 15 which faces the end-facing surface 14 of the housing. A second sealing stay 17 of the spring is fully and continuously circumferential near the outer circumference on the opposite end-facing side of the spring gasket 15 which axially faces the end-facing surface 34 of the accommodating device. The end-facing surface 14 of the housing comprises a fully circumferential and continuously smooth, for example planar sealing abutment for the sealing stay 16 of the spring, which axially faces the sealing stay 16 of the spring. The sealing stay 16 of the spring gasket 15 is in a sealing contact with this sealing abutment of the end-facing surface 14 of the housing. In a corresponding way, the end-facing surface 34 of the accommodating device circumferentially forms a continuous, smooth—for example, planar—sealing abutment which axially faces the second sealing stay 17 of the spring and is in a sealing contact with the sealing stay 17 of the spring. When the two sealing stays 16 and 17 of the spring are in the sealing contact with the respectively assigned sealing abutment, the spring gasket 15 separates the outlets 8 and 9 from the low-pressure side of the pump.

As can be seen in FIGS. 4 and 5, the spring gasket 15 is more gently rounded in each of a transition region connecting the inner circumference to the end-facing surface facing the end-facing wall 3 of the housing 3 and a transition region connecting the outer circumference to the end-facing surface facing the end-facing surface 34 of the accommodating device than in the other two free transition regions 18 and 19 in which there is no sealing contact. The comparatively flat sealing stays 16 and 17 of the spring are obtained by the softer rounding and/or the larger radius of curvature in the two transition regions exhibiting a sealing contact. Beyond the sealing stays 16 and 17 of the spring, the spring gasket 15 is uniformly round and smoothly curved with the same or also as applicable a different radius of curvature in each case. The flattening or soft rounding thus obtained better ensures that the sealing stays 16 and 17 of the spring slide on the respectively assigned sealing abutment of the end-facing surface 14 of the housing and the end-facing surface of the accommodating device, while maintaining the sealing contact, when the spring gasket 15 is compressed.

FIG. 6 shows a spring gasket 15a of a second example embodiment. The spring gasket 15a is a hollow-profile spring exhibiting a circular ring profile which encircles the outlets 8 and 9 (FIG. 3) continuously in a closed arc when the spring gasket 15a is used instead of the spring gasket 15 of the first example embodiment. Instead of a circular ring profile, the hollow-profile spring 15a could also exhibit a different self-contained annular cross-section, for example an elliptical hollow profile or other oval hollow profile.

FIG. 7 shows a spring gasket 15b of a third example embodiment. The spring gasket 15b is likewise a hollow-profile spring. Unlike the spring gasket 15a of the second example embodiment, the hollow profile of the spring gasket 15b is circumferentially open. In the example embodiment, the hollow profile of the spring gasket 15b is open and/or slotted radially inwards. In modifications, the hollow profile can also be open and/or slotted radially outwards. The hollow profile of the spring gasket 15b is C-shaped. The spring gasket 15b can likewise replace the spring gasket 15 of the first example embodiment.

FIG. 8 shows a spring gasket 15c of a fourth example embodiment. The spring gasket 15c is a V-profile spring, i.e. it is V-shaped in cross-section. When the spring gasket 15c is fitted, the V-profile annularly encircles the two outlets 8 and 9 (FIG. 3) in a self-contained arc. When it is fitted, one of the two limb ends of the V-profile is in a sealing contact with the end-facing surface 3 of the housing, and the free end of its other limb is in a sealing contact with the end-facing surface 14 of the accommodating device. The spring gasket 15c can replace the spring gasket 15 of the first example embodiment.

Figure 9:
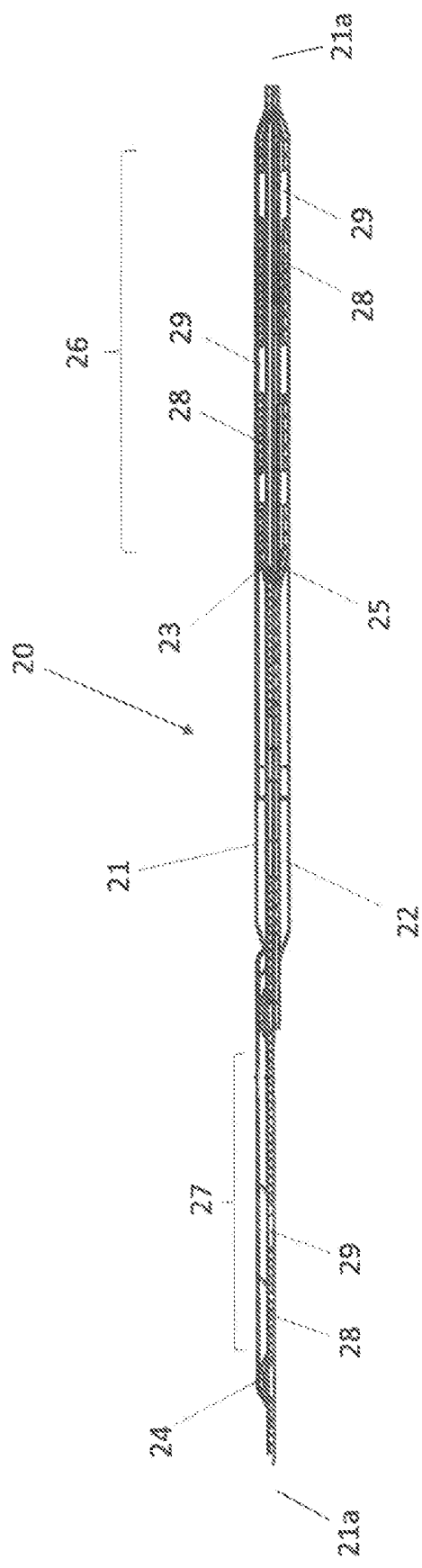
FIG. 9 an additional gasket, in a longitudinal section.

FIG. 9 shows the bead gasket 20 itself, isolated from the pump, in a longitudinal section.

The bead gasket 20 comprises a first bead loop 23 which surrounds the first inner region 26. The bead loop 23 is a smallest bead loop with respect to the inner region 26 and encloses the inner region 26, i.e. fully surrounds it, in an axial plan view. The bead loop 23 is a half-bead. When installed, the bead loop 23 axially faces the pump housing 1 and cannot therefore be seen in the view in FIG. 2.

The first bead loop 23 is rigidified in the inner region 26 as compared to conventional bead loops. It is rigidified by means of a first rigidifying structure 28 which extends circumferentially from the inner edge of the bead loop 23 into the inner region 26. The rigidifying structure 28 is shaped as a planar thin disc. It comprises a plurality of arranged adjacently passages 29 through which the fluid can flow when the pump is in operation. The rigidifying structure 28 extends along the entire inner circumference of the bead loop 23 and uniformly rigidifies the bead loop 23 radially inwards over the entire inner circumference.

The bead gasket 20 also comprises the additional, second bead loop 24 which can already be seen in FIG. 2 and which surrounds the second inner region 27 in the axial view. The bead loop 24 forms a smallest bead loop with respect to the inner region 27 and encloses the inner region 27, i.e. fully surrounds it, in the axial view. The second bead loop 24 is a full bead. The bead loop 24 is also rigidified in its inner region 27. It is rigidified by a second rigidifying structure 28 which is shaped, like the first rigidifying structure 28, as a planar thin disc. The rigidifying structure 28 extends uniformly over the entire inner circumference of the second bead loop 24 in order to uniformly rigidify it radially inwards over the inner circumference. Similarly to the first rigidifying structure 28, the second rigidifying structure 28 is also provided with a plurality of adjacently arranged passages 29 for the fluid delivered by the pump.

The first bead loop 23 and the second bead loop 24 are arranged adjacently in the axial view, such that the corresponding inner regions 26 and 27 are also arranged adjacently and at a distance from each other. In the example embodiment, the bead loops 23 and 24 also extend separately at a distance from each other. The central passage which serves to center the bead gasket 20 on the pump housing 1 is for example situated between the bead loops 23 and 24.

The bead gasket 20 also comprises the third bead loop 25 which can also be seen in FIG. 2 and which likewise surrounds the first inner region 26. The bead loop 25 is rigidified radially inwards, similarly to the bead loop 23. It is rigidified by a third rigidifying structure 28 which is shaped as a planar thin disc. The third rigidifying structure 28 corresponds to the first rigidifying structure 28 and, like the first rigidifying structure 28, comprises passages 29 for the fluid.

In the example embodiment, the first bead loop 23 and the third bead loop 25 overlap over their entire profile in the axial view. The third bead loop 25 is shaped, in accordance with the first bead loop 23, as a half-bead. The bead loops 23 and 25 splay away from each other in the axial direction from the outer circumference towards the inner region 26, thus increasing the axial spring deflection of the bead gasket 20 in the region of the bead loops 23 and 25 as compared to the respective individual bead 23 and 25. The increase in the axial spring deflection is advantageous with regard to compensating, as is desired, for variations in the axial width of the join to be sealed off.

The bead gasket 20 is multi-layered. It comprises a first gasket layer 21 and a second gasket layer 22. The first bead loop 23 and the first rigidifying structure 28 are part of the first gasket layer 21. The second gasket layer 22 forms the third gasket bead 25 and the third rigidifying structure 28. The gasket layers 21 and 22 lie one directly on top of the other. They can advantageously be joined to each other in a material fit, for example by means of a welded or soldered connection or an adhesive connection.

The first gasket layer 21 also forms the second bead loop 24 and the rigidifying structure 28 of the second bead loop 24.

The gasket layers 21 and 22 are sheet-metal structures. They can in particular be sheet-steel structures and preferably spring-steel structures. The sheet structures can however in principle also be plastic structures, for example so-called organic sheet structures. Sheet steel and in particular sheet spring steel are however preferred.

The bead gasket 20 comprises tongues 21a which protrude outwards on the outer circumference and serve to position the bead gasket relative to the pump housing 1 and which can co-operate with corresponding positioning elements of the pump housing 1, for example axial projections on the end-facing wall 3 of the housing. The tongues 21a can instead or in addition also serve to hold the gasket on the pump housing 1. For this purpose, the tongues 21a can be joined, for example screwed, soldered, welded, glued, etc., to the end-facing wall 3 of the housing. The tongues 21a can instead or preferably in addition engage behind the spring gasket 15 in the region of the inner circumference as viewed from the end-facing wall 3 of the housing, such that the spring gasket 15 is held loosely on the pump housing 1, within the framework of the pre-fitted fitting unit, when the tongues 21a engage behind it.

The bead gasket 20 is advantageously installed with an axial biasing force. The biasing force is expediently chosen such that it is ensures a spring force which is sufficient for a seal under all installation conditions, i.e. with regard to the unavoidable component tolerances and installation tolerances and moreover also with regard to the variations in the axial width of the join associated with changes in temperature and/or pressure. In advantageous embodiments, the bead gasket 20 is designed in the region of the bead loops 23 and 25 such that it can compensate for variations in the axial join width of at least 0.1 mm or at least 0.2 mm, preferably 0.3 mm or more, i.e. such that it ensures a sufficient seal over the respective range of variation in the axial join width.

The second bead loop 24 can be configured such that it rests against a circumferential edge surrounding the second outlet 9, in a seal, and simultaneously rests against the axially opposite end-facing surface 34 of the accommodating device, where it surrounds the second pressure port 32, in a seal. In the example embodiment, however, the second bead loop 24 only rests against the outer end-facing surface 14 of the housing with a certain biasing force, when the pump is fitted, and has no contact or at least no sealing contact with the end-facing surface 34 of the accommodating device. Separation from the first outlet 8 and first pressure port 31 is achieved by the first bead loop 23 and the third bead loop 25. Separation from the low-pressure side of the pump, in particular from the low-pressure chamber 35, is ensured by the spring gasket 15.

The bead gasket 20 is arranged in an indirect line of force to the spring gasket 15. The spring gasket 15 absorbs the majority of the axial force acting across the join when the join width is reduced. The spring gasket 15 is correspondingly designed such that it can compensate for variations in the axial join width of at least 0.1 mm or at least 0.2 mm, preferably 0.3 mm or more, and ensures a sufficient seal over the respective range of variation in the axial join width and simultaneously elastically absorbs the majority of the axial force acting across the join.

Figure 10:
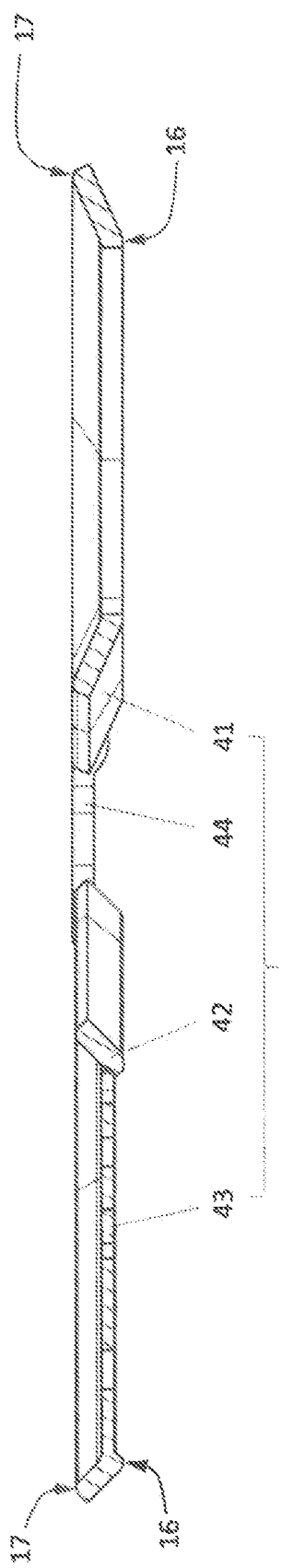
FIG. 10 a spring gasket of a fifth example embodiment, in a longitudinal section.

FIG. 10 shows a spring gasket 41 of a fifth example embodiment, in a longitudinal section. The spring gasket 41 is a disc spring which, unlike the spring gasket 15 of the first example embodiment, serves to seal off the outlet 8 only. The spring gasket 41 is part of a gasket unit 40 which, in addition to the spring gasket 41, comprises an additional gasket 42.

Figure 11:
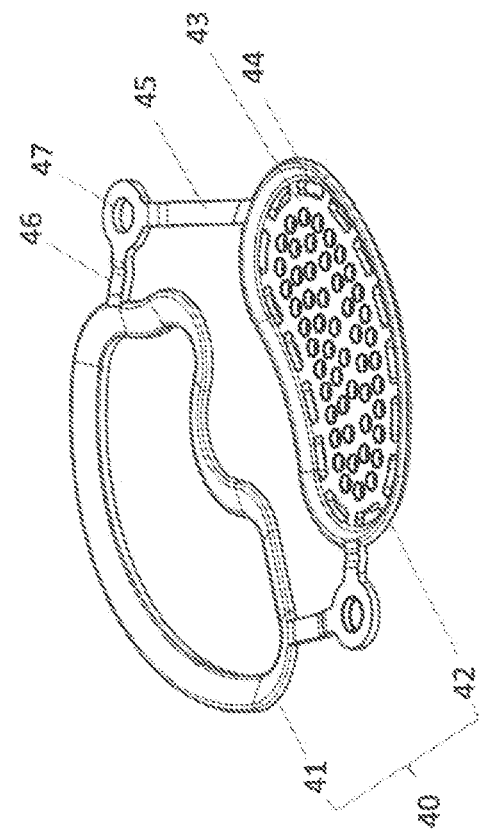
FIG. 11 the spring gasket of the fifth example embodiment, in an isometric view.

The gasket unit 40 is shown in an isometric view in FIG. 11. The additional gasket 42 is likewise a disc spring and serves to seal off the additional outlet 9 only. The spring gasket 41 and the additional gasket 42 are arranged adjacently in the longitudinal section (FIG. 10) and in the axial view and are connected to each other via two connecting stays 45 such that they can be handled as a gasket unit 40, i.e. as a single component, when pre-fitting the pump unit.

The spring gasket 41 encloses a free inner region which lies axially opposite the outlet 8 when fitted. The disc spring stay of the additional gasket 42 encloses an inner region which lies axially opposite the additional outlet 9 when fitted. In its inner region, the additional gasket 42 comprises a resistance structure 43 which is provided with passages. In the example embodiment, the resistance structure 43 is perforated with many small passages, for example transit holes. The resistance structure 43 forms a flow resistance for the fluid to be delivered. The flow resistance ensures that the vanes 11 (FIG. 1) are pressed radially outwards when the pump starts up, in particular during a cold start when the fluid is correspondingly viscous. In order to achieve this effect, the fluid delivered by the pump is applied to the undersides of the vanes 11 in the so-called sub-vane region. As mentioned, the resistance structure 43 serves to ensure that the sub-vane region is supplied with pressure fluid.

The resistance structure 43 generates a flow resistance, but is negligible in terms of the spring properties and gasket properties of the additional gasket 42. In order to achieve this, the resistance structure 43 exhibits a smaller material thickness than the disc spring stay of the additional gasket 42. This can be seen in the longitudinal section of FIG. 10. The additional gasket 42 can for example be formed with a flat base in a first step, which is thinned in a subsequent step by being embossed. The embossing process can for example expose the inner first sealing stay 16. When the pump is fitted, the exposed sealing stay 16 is in sealing contact with the end-facing surface 34 of the accommodating device (FIG. 3), and the axially opposite outer second sealing stay 17 is in sealing contact with the end-facing surface 14 of the housing. It is also conceivable for the gasket unit 40 to be reversed, such that the first sealing stay 16 is in sealing contact with the end-facing surface 14 of the housing, and the sealing stay 17 is in sealing contact with the end-facing surface 34 of the accommodating device.

In order to counteract a rigidification of the additional gasket 42 even further, the resistance structure 43 is repeatedly worked off directly at its edge via which it is connected to the disc spring stay of the gasket 42, such that cavities 44 are formed along this edge in such a way that the resistance structure 43 is only then connected to the disc spring stay of the additional gasket 42 by narrow stays which extend between the cavities 44.

On the one hand, the connecting stays 45 connect the spring gasket 41 and the additional gasket 42 fixedly enough that the gasket unit 40 can be handled as a unit when being pre-fitted and the two gaskets 41 and 42 retain their position relative to each other. On the other hand, the connecting stays 45 are flexible enough to not noticeably hinder the spring compression of the gaskets 41 and 42 when fitting the pump unit and their spring compression and spring extension when the pump is in operation. In order to increase flexibility and, by association, a certain resilience, the connecting stays 45 each comprise multiple impressions 46. The material thickness is reduced in the region of the impressions 46 by impressing.

The gasket unit 40 can be joined to the pump housing 1 in the region of the connecting stays 45. In order to be joined, the connecting stays 45 are each provided with a passage 47 for a joining element, for example a fastening screw for establishing a screw connection.

If the gasket unit 40 is used, comprising the two gaskets 41 and 42 which are arranged adjacently and in parallel in relation to the delivery of the fluid, then no additional gasket is required, not even an additional spring gasket to hold the housing walls 2, 3 and 4 axially in a sealing pressure contact. On the one hand, the gasket unit 40 can reduce the number of components, since the sealing function and pressing function are combined in a single component. On the other hand, the gasket unit 40 can be manufactured in a comparatively easy way by being embossed and punched.

REFERENCE SIGNS 1 pump housing
2 circumferential wall of the housing
3 end-facing wall of the housing
4 end-facing wall of the housing
5 delivery chamber
6 inlet
7 inlet
8 outlet
8' connecting channel
9 outlet
9' connecting channel
10 delivery member
11 vane
12 drive shaft
13 holder
14 outer end-facing surface of the housing
15 spring gasket
15a spring gasket
15b spring gasket
15c spring gasket
16 sealing stay of the spring
17 sealing stay of the spring
18 transition region
19 transition region
20 additional gasket, bead gasket
21 gasket layer
21a tongue
22 gasket layer
23 bead loop
24 bead loop
25 bead loop
26 inner region
27 inner region
28 rigidifying structure
29 passage
30 accommodating device 31 pressure port
32 pressure port
33 radial gasket
34 end-facing surface of the accommodating device
35 low-pressure space
40 gasket unit
41 spring gasket
42 additional gasket
43 resistance structure
44 cavity
45 connecting stay
46 impression
4 passage

The invention claimed is:

1. A pump for applying fluid to an assembly, the pump comprising:
a pump housing including
a circumferential wall surrounding a delivery chamber of the pump;
an end-facing wall having an outer end-facing surface facing axially positioned away from the delivery chamber;
an inlet for receiving fluid into the delivery chamber;
an outlet for the fluid which emerges from the outer end-facing surface via the delivery chamber;
a delivery member which rotates within the delivery chamber, the delivery member delivering fluid within the delivery chamber from a low-pressure side of the pump which contains the inlet to another portion of the delivery chamber located on a high-pressure side of the pump which contains the outlet; and
an axial gasket being a spring gasket, the spring gasket fully encircles the outlet over 360° when viewed in an axial view of the pump in order to separate the outlet from the low-pressure side of the pump, wherein the spring gasket is annularly self-contained within the pump and is one of a disc spring or a hollow-profile spring or a V-profile spring or a bellows spring, and during operation of the pump the spring gasket performs
(i) a function of sealing the outlet of the pump housing from the low-pressure side of the pump, and
(ii) a function of a pressing device to keep the circumferential wall of the pump housing engaged to the end-facing wall of the pump housing in a fluid-tight axial pressure contact so that the spring gasket alone performs the function of sealing the outlet of the pump housing from the low-pressure side of the pump.

2. The pump according to claim 1, wherein the spring gasket is the disc spring, and the disc spring comprises an inner circumference and an outer circumference which is axially offset with respect to the inner circumference, the disc spring further including a first sealing stay being fully circumferential near the inner circumference and a second sealing stay facing axially away from the first sealing stay, the second sealing stay being fully circumferential near the outer circumference, and wherein one of the sealing stays axially faces the outer end-facing surface of the pump housing and overlaps with the outer end-facing surface of the pump housing in the axial view, in order to separate the outlet from the low-pressure side in a fully circumferential sealing contact with the outer end-facing surface of the pump housing.

3. The pump according to claim 2, wherein:
the disc spring extends from the inner circumference to the outer circumference over a first end-facing surface which axially faces the outer end-facing surface of the pump housing and extends over a second end-facing surface facing axially away from the outer end-facing surface of the pump housing,
a first transition region circumferentially connects the inner circumference to the first end-facing surface and a second transition region circumferentially connects the outer circumference to the second end-facing surface, a third transition region circumferentially connects the inner circumference to the second end-facing surface and a fourth transition region circumferentially connects the outer circumference to the first end-facing surface, and
one of the sealing stays of the disc spring extends in the first transition region and the other of the sealing stays of the disc spring extends in the second transition region, and at least one of the sealing stays of the disc spring is flattened and/or rounded with a larger radius of curvature as compared to the third transition region and/or the fourth transition region.

4. The pump according to claim 1, wherein the spring gasket is a purely metal spring.

5. The pump according to claim 1, wherein a portion of the spring gasket is located nearest the low-pressure side of the pump in a pressure path extending along the pump housing from the high-pressure side of the pump to the low-pressure side of the pump.

6. The pump according to claim 1, wherein a portion of the spring gasket is located nearest the outlet in a pressure path extending along the pump housing from the outlet to the low-pressure side of the pump.

7. The pump according to claim 1, wherein the pump comprises an additional gasket which surrounds the outlet in the axial view in order to seal the outlet off, and the spring gasket surrounds the additional gasket.

8. The pump according to claim 7, wherein the additional gasket is a bead gasket.

9. The pump according to the claim 7, wherein the additional gasket is a metal bead gasket.

10. The pump according to claim 7, wherein the pump is fitted in or on an accommodating device, and the additional gasket is arranged between the outer end-facing surface of the pump housing and an end-facing surface of the accommodating device in an axial indirect line of force to the spring gasket.

11. The pump according to claim 1, wherein the pump comprises a first flux including the inlet and the outlet and an additional flux including an additional outlet, and the spring gasket also surrounds the additional outlet in the axial view, in order to separate the outlets from the low-pressure side.

12. The pump according to claim 11, wherein the additional flux further includes an additional inlet.

13. The pump according to claim 1, wherein the pump comprises a first flux including the inlet and the outlet, an additional flux including an additional outlet, and an additional axial gasket in the form of an additional spring gasket which surrounds the additional outlet in the axial view, wherein the spring gasket and the additional spring gasket are each disc springs and are arranged adjacently in the axial view in order to separate the outlets from each other and from the low-pressure side of the pump.

14. The pump according to claim 13, wherein the additional flux further includes an additional inlet.

15. The pump according to claim 1, wherein the pump is fitted in or on an accommodating device, and the spring gasket is arranged and axially tensed between the outer end-facing surface of the pump housing and an end-facing surface of the accommodating device in an axial direct line of force.

16. The pump according to claim 1, wherein: the pump comprises an accommodating device or is arranged in an accommodating device; the accommodating device surrounds the pump housing and comprises a base featuring an end-facing surface of the accommodating device and a port for the outlet; and the spring gasket is in a sealing contact with each of the outer end-facing surface of the pump housing and the end-facing surface of the accommodating device, in order to separate the high-pressure side from the low-pressure side of the pump.

17. The pump according to claim 16, wherein the spring gasket includes a first sealing stay and a second sealing stay, the end-facing surface of the accommodating device is circumferentially smooth in the region of the second sealing stay which axially faces the end-facing surface of the accommodating device, in order to circumferentially form an uninterrupted sealing abutment for the second sealing stay which axially faces the end-facing surface of the accommodating device, and/or the outer end-facing surface of the pump housing is circumferentially smooth in the region of the first sealing stay which axially faces the outer end-facing surface of the pump housing, in order to circumferentially form an uninterrupted sealing abutment for the first sealing stay which axially faces the outer end-facing surface of the pump housing.

18. The pump according to claim 17, wherein the end-facing surface of the accommodating device is circumferentially planar in the region of the second sealing stay of the spring gasket which axially faces the end-facing surface of the accommodating device.

19. The pump according to claim 17, wherein the outer end-facing surface of the pump housing is circumferentially planar in the region of the first sealing stay of the spring gasket which axially faces the outer end-facing surface of the pump housing.

20. The pump according to claim 1, wherein the circumferential wall of the pump housing and the end-facing wall of the pump housing axially engagingly contact each other in the fluid-tight axial pressure contact and delineate the delivery chamber at its circumference and on an end-facing side thereof, and the spring gasket presses the end-facing wall axially against the circumferential wall with a spring force when the end-facing wall and the circumferential wall are assembled together at initial assembly of the pump.

* * * * *